United States Patent [19]

Corcoran

[11] Patent Number: 5,104,153
[45] Date of Patent: Apr. 14, 1992

[54] FITTINGS FOR PIPE

[75] Inventor: Daniel P. Corcoran, Grand Rapids, Mich.

[73] Assignee: Sprink, Inc., Fullerton, Calif.

[21] Appl. No.: 271,532

[22] Filed: Nov. 15, 1988

[51] Int. Cl.⁵ ............................................. F16L 17/04
[52] U.S. Cl. .................................. 285/112; 285/367; 285/373
[58] Field of Search ............... 285/373, 909, 293, 112, 285/367; 277/220, 221

[56] References Cited

U.S. PATENT DOCUMENTS

| | | |
|---|---|---|
| 48,517 | 7/1865 | Chambers . |
| 147,837 | 2/1874 | Heginbothom . |
| 212,547 | 2/1979 | Forbes . |
| 314,066 | 3/1986 | Sergeant . |
| 347,461 | 8/1886 | Leprevost-Bourgerel . |
| 377,130 | 1/1888 | White . |
| 510,481 | 12/1893 | Linzeler et al. . |
| 684,582 | 10/1901 | McGuire . |
| 749,465 | 1/1904 | Thorpe . |
| 858,575 | 7/1907 | Claflin . |
| 1,230,742 | 6/1917 | McMuririe . |
| 1,443,579 | 1/1923 | Lippincott . |
| 1,505,255 | 8/1924 | Gold . |
| 1,522,013 | 1/1925 | Goodall . |
| 1,831,641 | 11/1931 | Skinner . |
| 1,928,316 | 9/1933 | Muto . |
| 1,948,274 | 2/1934 | McMurray ........................ 285/373 |
| 1,978,453 | 10/1934 | Flynn . |
| 2,208,660 | 7/1940 | Brunelle . |
| 2,377,510 | 6/1945 | Newell ............................... 285/112 |
| 2,752,173 | 6/1956 | Krooss . |
| 2,936,186 | 5/1960 | Dunmire . |
| 3,054,629 | 9/1962 | Piatek . |
| 3,186,744 | 6/1965 | Smith et al. ........................ 285/373 |
| 3,189,969 | 5/1965 | Sweet . |
| 3,251,615 | 5/1966 | Short, III . |
| 3,643,986 | 2/1972 | Allan . |
| 3,756,629 | 9/1973 | Gibb . |
| 3,771,820 | 11/1973 | Hoss, Sr. et al. . |
| 3,861,180 | 1/1975 | Heckrotte, Sr. et al. . |
| 4,108,480 | 8/1978 | Ettema . |
| 4,352,512 | 10/1982 | Janssen et al. . |
| 4,373,235 | 2/1983 | Korgaonkar . |
| 4,408,788 | 10/1983 | Beukema . |
| 4,471,979 | 9/1984 | Gibb et al. . |
| 4,522,434 | 6/1985 | Webb . |
| 4,561,678 | 12/1985 | Kunsman . |
| 4,583,770 | 4/1986 | Kreku ........................... 285/373 X |
| 4,601,495 | 7/1986 | Webb . |
| 4,611,839 | 9/1986 | Rung et al. . |
| 4,639,020 | 1/1987 | Runy ................................. 285/367 |
| 4,702,499 | 10/1987 | deRaymond et al. . |

FOREIGN PATENT DOCUMENTS

| | | |
|---|---|---|
| 25393 | 1/1884 | Fed. Rep. of Germany . |
| 2051500 | 10/1979 | Fed. Rep. of Germany ...... 277/220 |
| 218594 | 4/1959 | U.S.S.R. ........................... 277/221 |
| 790109 | 2/1958 | United Kingdom ............... 285/373 |
| 1075457 | 7/1967 | United Kingdom . |

Primary Examiner—Dave W. Arola

[57] ABSTRACT

What has been described in its simplest form is a coupling segment, which when used in conjunction with a like coupling segment, provides a coupling for use in securing the juxtaposed ends of pipe, such pipe having grooves encircling their ends. There is also provided a coupling for the holding of pipe ends and a method of securing pipe to form a pipeline.

17 Claims, 4 Drawing Sheets

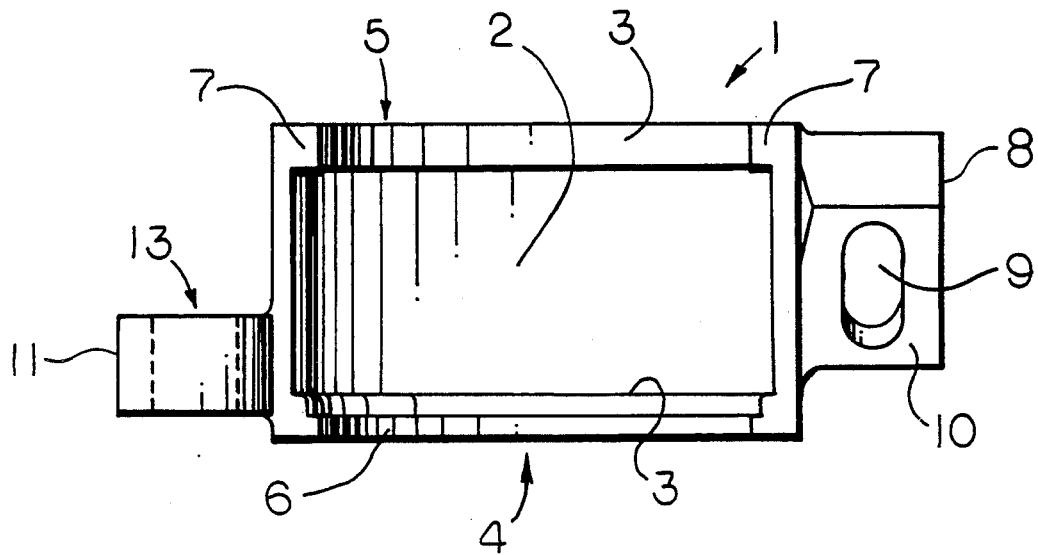
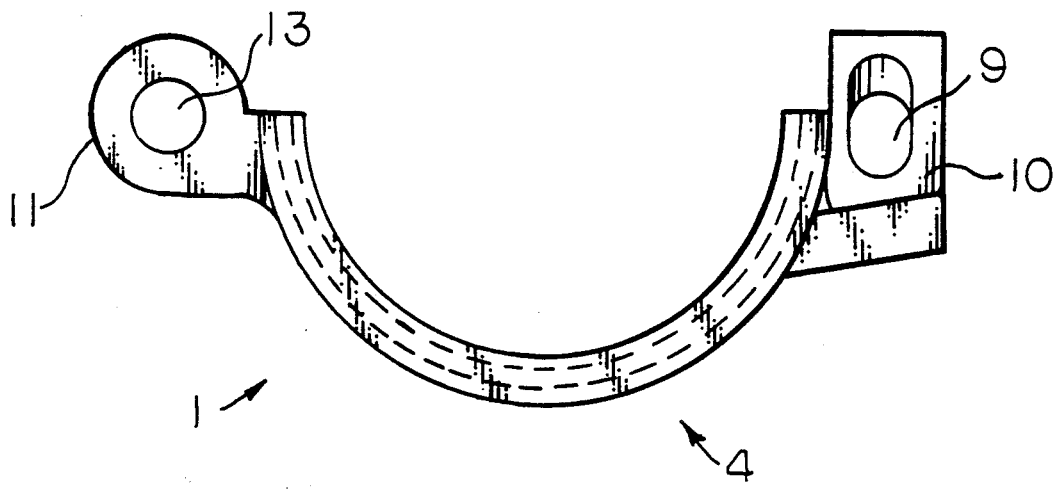
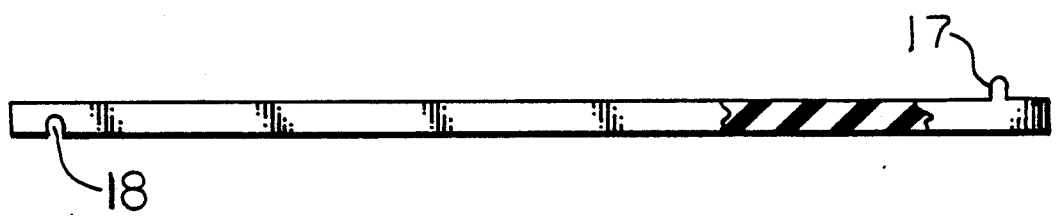

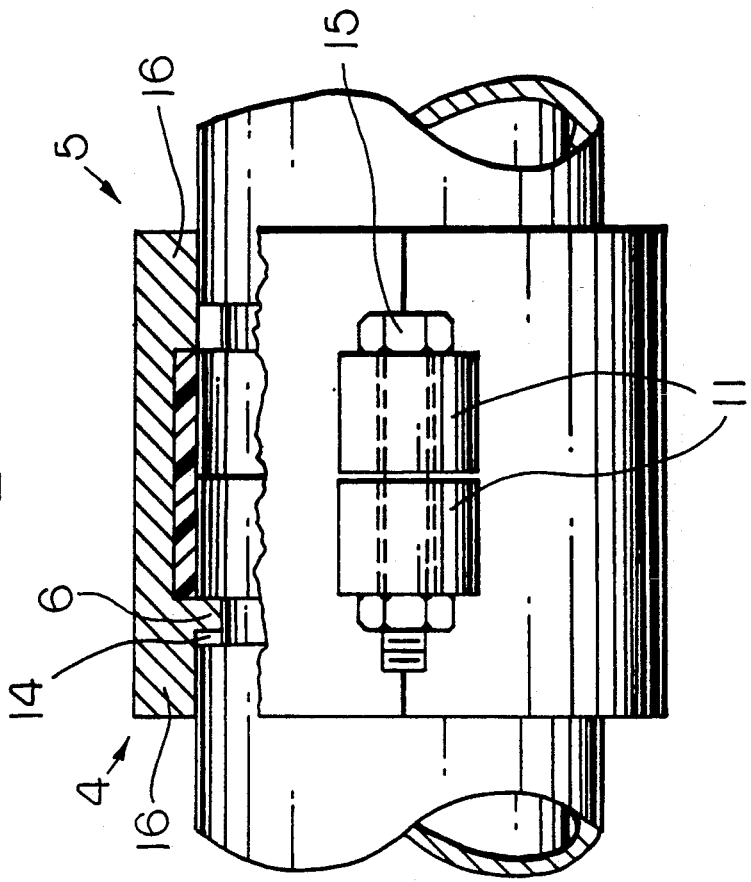
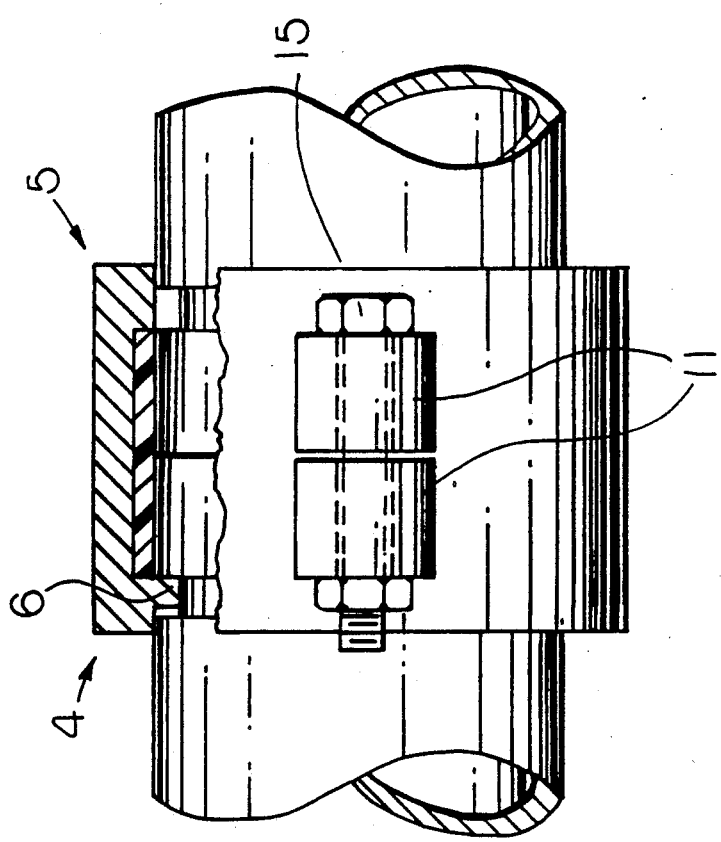

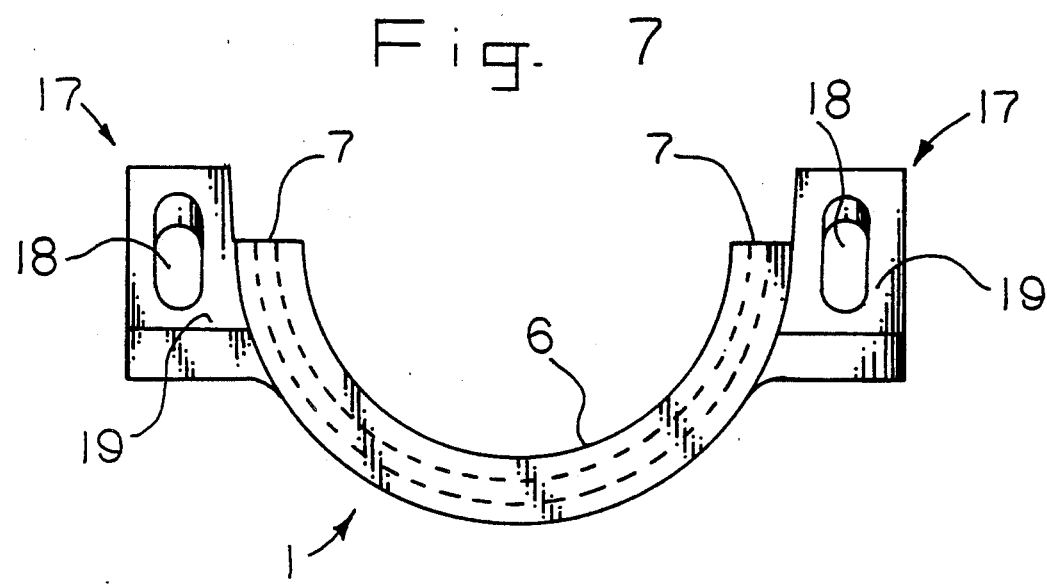
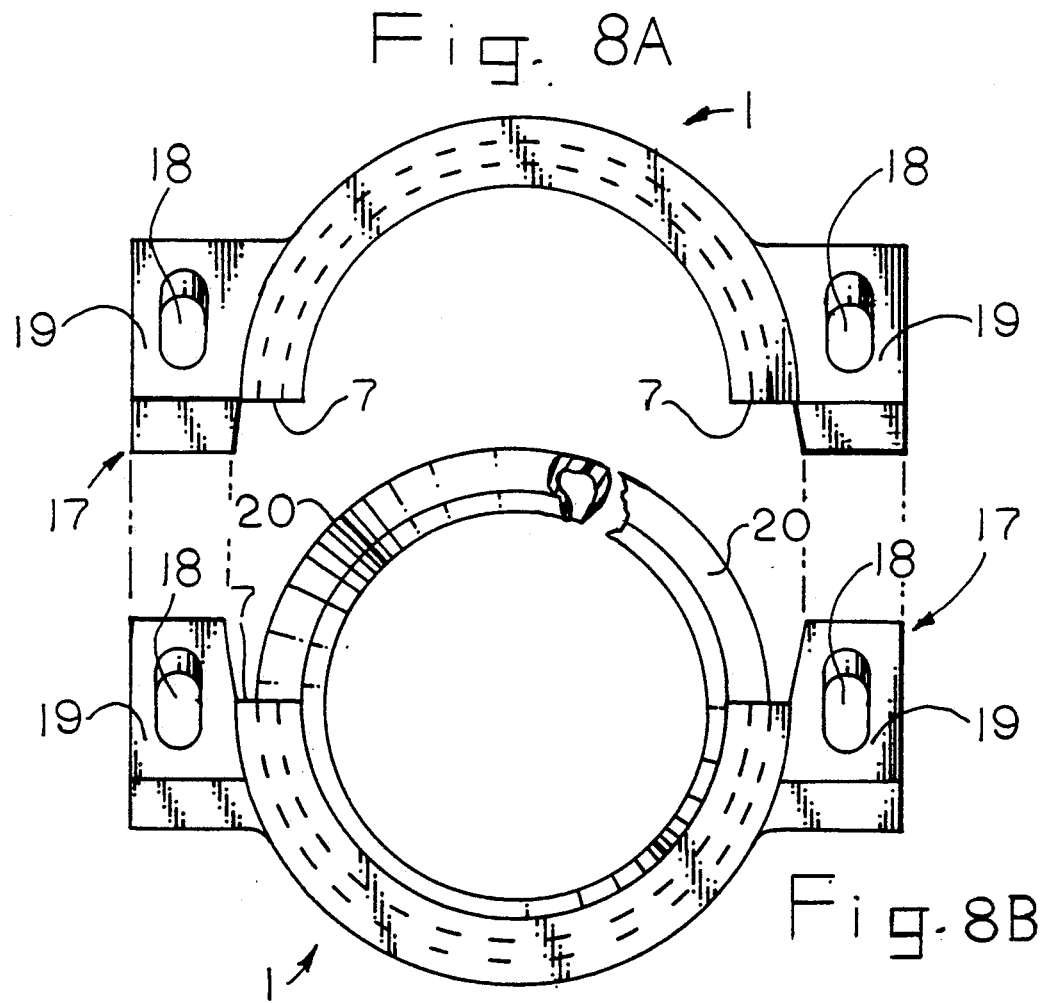

FITTINGS FOR PIPE

FIELD OF INVENTION

This invention deals with pipe fittings and a method of coupling pipe using the inventive fittings. The method referred to herein is the common method of joining segments of pipe by their ends to create a pipeline Thus, when the word "pipe" is used herein, it means a pair of pipes that are being joined by their adjacent ends to form a continuous pipeline. The fittings (hereinafter "couplings") of this invention provide a rigid clamp for the pipe ends to eliminate or significantly reduce relative translational or rotational movement of the pipes after they have been coupled. The couplings of this invention have the advantage that they provide a positive coupling action without the problems of gaps created by undue flexure of the pipe and they have the advantage of maintaining a cohesive sealing of the pipeline joint created by the abutting of two pipe ends to create the pipeline, despite differences in the diameter of the pipes or variations in the means for locking the pipes together, created by their manufacturing processes.

Typically, such pipeline assemblies are employed for conveying fluids under pressure and in particular relate to pipelines comprising plural arcuate coupling segments having keys on their inner periphery for engagement with grooved or beaded pipe ends, and which have an internal channel in which a sealing means such as a gasket is received.

BACKGROUND OF THE INVENTION

The use of segmented couplings with fastening means to achieve mechanical couplings for joining and sealing the ends of pipes has been widely utilized by the industry because of the convenience of installing such devices. Such segmented couplings have been extensively patented since 1960 and have been used, for example in the installation of overhead sprinkling systems in fire prevention equipment. The patents describe many variations on the basic segmented coupling and it is just in the last few years that this industry has become sophisticated to the extent that intricate designs have played a major role in the utility of the coupling devices as they are being commercially used today.

One such coupling device is disclosed in U.S. Pat. No. 3,054,629 issued Sept. 18, 1962, and includes a pair of arcuate coupling segments which span and embrace the adjacent ends of a pair of pipes which compress a sealing gasket into engagement with the external periphery at the end of the pipes. The coupling segments have inwardly extending engagement means for engagement within grooves in the adjacent pipe ends, and have radially extending pads at their ends which receive bolts employed for the tightening down of the coupling. It should also be noted, that the bolts tighten in the vertical axis of the coupling, at both ends of the coupling, and not along the longitudinal axis of the pipe, thus not giving any longitudinal draw to the coupling.

Typically, when the segments are secured together they extend in a continuous ring about the circumference of the pipe ends and attempt to eliminate gaps between the segments and the pipes. On the other hand, differences in the diameter of stock pipe of the same nominal diameter result in a less than optimal immobilization of the pipe ends, and gaps which permit extrusion of the gasket contained therein, are formed. Problems also arise due to differences in the depth of the groove on the pipe ends or the height of the beads placed thereon for secure coupling. If the pipes are undersized in diameter, or the groove diameter is too small, then the bolting pads may be brought into face engagement with each other, but the desired immobilizing clamping force on the pipe ends may not be obtained owing to the ill fit of the device or the lack of longitudinal draw. If the pipes are oversized in diameter, or the groove diameter is too large, then the bolting pads may not be brought into essential face engagement with each other and may leave a gap between the bolting pads through which the gasket can rupture and extrude. To overcome these problems, closely spaced supports or hangers have been employed to eliminate undesirable flexure at the joint, or extrusion shields have been provided to support the gaskets in the area of the gap between the bolting pads.

Gibb, et al. in U.S. Pat. No. 4,471,979, teaches that thin-walled piping which is inherently capable of moving out-of-round under compressive stresses produced by the tightening down of the coupling, can be handled by deliberate formation of the coupling segments to have them subtend an angle of less than 180 degrees at their end faces, to permit the centers of curvature of the respective coupling segments to move beyond and to the opposite side of the diametral plane of the coupling. This selective deformation of the pipe ends by that coupling provides for rigid clamping of the coupling onto the pipe ends without regard to whether the pipes are oversized or undersized within the range of manufacturing tolerances. It should be noted that this reference also deals with fastening means which are bolts which tighten in the vertical axis of the coupling at both ends of the coupling, and not along the longitudinal axis of the pipe thus, as mentioned above, it does not give any longitudinal draw to the coupling. This construction has little utility for use with conventional pipe that is not readily deformable by a coupling, and does not entirely eliminate the need for extrusion shields in those circumstances where the bolting pads do not reach total end face engagement with each other.

Gibb, in a later patent. U.S. Pat. No. 3,756,629, issued Sept. 4, 1973, teaches a stud system of joining pipe and the couplings used for that joining. In this reference, radially projecting studs are secured around the outer circumference of pipes near the pipe ends by arc stud welding. The couplings may be formed in two or more arcuate parts which mate to form a complete ring.

Much later, in U.S. Pat. No. 4,522,434, issued June 11, 1985. Webb teaches a segmented coupling for use in a high-pressure piping system having cast multiple keys in their as-cast condition, which are for reception within corresponding plural or multiple grooves in pipe ends. Crushing of the operative faces of the keys and cold working of the faces of the pipe grooves in engagement therewith provide for equalization of the axial loading imposed on the respective keys. The draw down devices of that invention are all designed to draw in the same direction, none of which draw in the longitudinal axis of the pipe.

Kunsman, in U.S. Pat. No. 4,561,678, issued Dec. 31, 1985, teaches a coupling similar to the Webb device, but in addition teaches a tool that can be used with lugs on the device to give easy and secure placement of the coupling on the pipe. Kunsman, except for the arrangement of the tool lugs and the like on the coupling, do not add to the teaching of the Webb disclosure. The same can be stated about the teaching found in U.S. Pat. No. 4,601,495, issued on July 22, 1986 to Webb in that the same essential coupling as described in the Webb '434 patent and the Kunsman patent is described therein.

DeRaymond et al in U.S. Pat. No. 4,702,495 teaches a hingeable segmented pipe coupling which has as its main feature, a specific design for the hinged portion of the coupling. It is noted that the coupling has only vertical fastening means and that there is no draw along the longitudinal axis of the pipe.

Finally, U.S. Pat. Nos. 4,611,839 and 4,639,020, issued on Sept. 16, 1986 and Jan. 27, 1987, respectively, are related and describe a self-adjusting pipe clamp and coupling which is segmented and which includes coupling segments having bolting pads at their ends, the ends of the coupling segments include inclined end faces for cooperation with corresponding inclined end faces of an adjacent coupling segment to produce self-adjustment of the coupling and rigid clamping of the pipe ends upon tightening down of the coupling. It should be noted that both of these references teach exactly the same coupling and that these are the only two references that teach such a concept, and that that teaching deals mainly with the inclined end faces of the coupling segments, and that the references teach several types of bolting arrangements, with the exception that they do not teach a bolting arrangement in which the bolts are drawn along the longitudinal axis of the pipe when a separate end face is constructed on the coupling segment to prevent rotational twist and pipe gaggage, nor do they teach the use of end faces that are essentially planar in the diametral X-Z plane and parallel to the Z axis of the pipe coupling. For example, in FIG. 26, therein, there is shown a vertical bolting arrangement which contains a pin having its longitudinal axis parallel with the longitudinal axis of the pipe but the pin does not have a drawing action along the longitudinal axis of the pipe, and further, it only has the function of holding the parts of the hinge together and allowing rotation of the hinged parts around its outer circumference.

The '839 and 020 patents each teach the use of inclined faces on the bolt lugs to achieve a movement of the arcuate segments such that they are intended to reduce the internal circumference of the coupling as it is tightened and to give positive clamping on the pipe ends. The arcuate segments having angled faces as taught in the '839 and '020 patents however have significant disadvantages when in actual use. If those skilled in the art study those references carefully, they will note at least two significant differences between the prior art couplings and those of the instant invention. The prior art segments do not have end faces on the couplings that are planar in the diametral X-Z plane (defined infra) and which extend parallel to the Z axis of the pipe coupling; the prior art segments do not have oblique angled faces on the bolt lugs which draw to the inside and which allow a draw of the segment along the parallel axis of the pipe when it is situated in the coupling and, in one preferred embodiment of the instant invention, the prior art does not teach the use of lugs to give a direct draw along the long axis of the pipe when it is positioned in the coupling. Thus, the prior art, oblique angled segments all have angles which cause the coupling to be drawn to the outside in directions not exactly parallel to the long axis of the pipe. Thus, when the arcuate segments of the prior art are put together to form a coupling around a pipe and then tightened, the beveled faces of the segments cause rotational twist which causes forces on the pipe ends which cause the pipe ends to separate. This is true because the prior art couplings do not have the end faces that are planar in the diametral X-Z plane and parallel to the Z axis of the pipe coupling. These faces, as disclosed in the instant invention, will not allow the coupling segments of the instant invention to exceed a predetermined reduction of the internal circumference of the coupling when it is tightened and thus, the rotational twist is prevented. The couplings of the instant invention will couple pipe ends together to give a coupling which has zero flex and absolutely no gappage occurs between the pipe ends, and further, couplings of the instant invention, even-though they are lighter in weight and construction, have greater strength than those couplings of the prior art, especially those that are disclosed in the '839 and '020 patent disclosures.

Thus, it does not appear that the instant invention has been disclosed in the prior art and the advantages of the instant invention are not therefore obvious to those skilled in the art.

THE INVENTION

The couplings of the present invention overcome the problems of the prior art devices and provide new and novel coupling approaches to overcoming such problems.

The couplings of the instant invention have the advantage of being easily assembled, easily disassembled, prevent flex in the pipes that are clamped by the inventive couplings because of their unique design, prevent the extrusion or rupturing of the seals used with them, provide automatic adjustment of the effective length of the inner periphery of the coupling to that of the periphery of any pipe, groove, or bead having an external diameter falling within the manufacturing tolerance range and they also have the advantage of automatically providing for self-adjustment of the couplings to bring the keys into clamping engagement with the pipes, and moreover, they have the advantage of being manufactured in only one configuration such that all of the segments of a coupling are essentially identical such that there is no problem with storing two or more different segments, there is no problem with a top piece and bottom piece, or right piece or left piece, and the like. It should be recognized by those skilled in the art upon reading this complete specification and claims, that the engagement means in one of the preferred embodiments of the coupling segments of the instant invention provide an extreme amount of clamping in both the radial and axial directions because each inwardly extending engagement means has no counterpart on the opposite coupling segment. Further, one of the fastening means of one of the preferred embodiments of the instant invention has a draw in the longitudinal axis of the pipe. In addition, all the couplings of the instant invention have the advantage that they have the end faces that lie in the X-Z plane of the pipe coupling and are parallel to the long axis of the pipe when it is positioned in the coupling of the instant invention.

Thus, clamping is optimum in the radial direction and optimum in the axially direction in all cases, and there are no gaps in between the pipe ends and the pipe connections are infinitely stronger than those provided by the prior art devices.

Thus there is provided one type of an arcuate coupling segment, said coupling segment, for purposes of the following disclosure being referred to as the "hemihedral" segment said coupling segment comprising an arcurate body comprised of radial and axial walls providing for the reception of a sealing means, said radial walls defining a leading edge and a following edge of the arcurate body; said arcuate body having radially inwardly extending engagement means near the following edge for clamping engagement with ends of pipe members arranged in juxtaposed relationship; said arcurate body terminating in bolt pads at both ends, said bolt pads being used as a means for securing one coupling segment to another like coupling segment in end-to-end encircling relationship about said pipe; first said bolt pad being located near to the leading edge of the arcurate body thereof and having an opening therethrough, said first bolt pad having an inclined end face aligned for sliding face engagement with a like inclined end face of one other coupling segment, said end face being inclined at an oblique angle to the diametral X-Z plane of a pipe coupling and extending perpendicular to the Y-Z plane of a pipe coupling; a second bolt pad on the opposite end of the arcuate body and near to the following edge thereof, being a lug having a opening therethrough for receiving a fastening means, said lug being aligned such that an axis through the center of the opening is aligned parallel to the longitudinal axis of the pipe.

There is further provided a pipe coupling, hereinafter referred to as "hemihedral pipe coupling", of the type including two arcuate coupling segments and a fastening means, each said coupling segment being configured essentially identical to the other, each said coupling segment comprising an arcurate body comprised of radial and axial walls providing for the reception of sealing means, said radial walls defining a leading edge and a following edge of the arcurate body; each said arcuate body having radially inwardly extending engagement means near the following edge for clamping engagement with ends of pipe members arranged in juxtaposed relationship; each said arcuate body terminating in bolt pads at both ends said bolt pads being used as a means for securing one coupling segment to another like coupling segment in end-to-end encircling relationship about said pipe; first said bolt pad being located near to the leading edge of the arcuate body thereof and having an opening therethrough, said first bolt pad having an inclined end face aligned for sliding face engagement with a like end face of one other such coupling segment, said end face being inclined at an oblique angle to the diametral X-Z plane of the pipe coupling and extending perpendicular to the Y-Z plane of the pipe coupling; a second bolt pad on the opposite end of the arcuate body and near to the following edge thereof, being a lug having a opening therethrough for receiving a fastening means, said lug being aligned such that an axis through the center of the opening is aligned parallel to the longitudinal axis of the pipe; said fastening means relative to the first bolt pad being operative to urge said end faces of the first bolt pad of each coupling segment towards each other and then to slide said end faces across each other to reduce the effective internal circumferential length of the inner periphery of said coupling; said fastening means relative to the second bolt pad being operative to draw the inwardly extending engagement means against the pipe and along the Z axis of the pipe, permitting said engagement means to clamp onto and secure the pipe.

The advantages of one preferred embodiment of the instant invention are provided by a combination of the placement of a first bolting pad on the coupling segment and by forming an inclined end face on the first bolting pad at an oblique angle to the diametral plane of the coupling, hereinafter defined as the diametral X-Z plane, the end face having the ability to slide relative to a like end face on an essentially identical coupling segment as the coupling segments are placed opposite each other on a pipe and tightened.

Further, the advantages of one preferred embodiment of the instant invention are provided by the formation of a hemihedral engagement means which is an inwardly extending engagement means on only the following edge of such a coupling segment, and finally, the advantages of the instant invention are provided by providing a second bolting pad on the coupling segment which has an alignment such that when the fastening means is placed through the bolting pad and tightened, there is a direct draw along the longitudinal axis of the pipe with which it is being coupled.

In one further embodiment of this invention, there is provided a coupling, designated hereinafter for purposes of this disclosure as a "difaced pipe coupling", of the type including two arcuate coupling segments and a fastening means, each said coupling segment being configured essentially identical to the other, each said coupling segment comprising: an arcurate body comprised of radial and axial walls providing for the reception of sealing means, said radial wall defining a leading edge and a following edge of the arcurate body; each said arcuate body having radially inwardly extending engagement means near the following edge and the leading edge for clamping engagement with ends of pipe members arranged in juxtaposed relationship; each said arcuate body having first end faces on each end of the arcuate body which can be positioned in facial engagement with like end faces of one other like coupling segment, said first end faces being essentially planar in the diametral X-Z plane of a pipe coupling and extending parallel to the Z axis of the pipe coupling; each said arcuate body terminating in bolt pads at both ends, said bolt pads being used as a means for securing one coupling segment to another like coupling segment in end-to-end encircling relationship about said pipe; said bolt pads being located near to the leading edge of the arcuate body thereof and having an opening therethrough to receive a fastening means, each said bolt pad having an inclined end face aligned for sliding face engagement with a like end face of one other such coupling segment, each said inclined end face being inclined at an oblique angle to the diametral X-Z plane of the pipe coupling and extending perpendicular to the Y-Z plane of the pipe coupling; said fastening means relative to the bolt pads being operative to urge said end faces of each bolt pad of each coupling segment towards each other and then to slide said end faces across each other to reduce the effective internal circumferential length of the inner periphery of said coupling in order to draw the inwardly extending engagement means against the pipe and along the Z axis of the pipe, permitting said engagement means to clamp onto and secure the pipe.

There is further provided by this invention, a bifaced arcuate coupling segment, said coupling segment comprising: an arcurate body comprised of radial and axial walls providing for the reception of a sealing means, said radial walls defining a leading edge and a following edge of the arcurate body; each said arcuate body having radially inwardly extending engagement means near the following edge and the leading edge for clamping engagement with ends of pipe members arranged in juxtaposed relationship; each said arcuate body having first end faces on each end of the arcuate body which can be positioned in facial engagement with like end faces of one other like coupling segment, said first end faces being essentially planar in the diametral X-Z plane of a pipe coupling and extending parallel to the Z axis of the pipe coupling; each said arcuate body terminating in bolt pads at both ends, said bolt pads being used as a means for securing one coupling segment to another like coupling segment in end-to-end encircling relationship about said pipe; said bolt pads being located near to the leading edge of the arcuate body thereof and having an opening therethrough to receive a fastening means, each said bolt pad having an inclined end face aligned for sliding face engagement with a like end face of one other such coupling segment each said inclined end face being inclined at an oblique angle to the diametral X-Z plane of the pipe coupling and extending perpendicular to the Y-Z plane of the pipe coupling; said fastening means relative to the bolt pads being operative to urge said end faces of each bolt pad of each coupling segment towards each other and then to slide said end faces across each other to reduce the effective internal circumferential length of the inner periphery of said coupling in order to draw the inwardly extending engagement means against the pipe and along the Z axis of the pipe, permitting said engagement means to clamp onto and secure the pipe.

The advantages of this embodiment of the instant invention are provided by a combination of the end face in the diametral X-Z plane and parallel to the long axis of the pipe when it is secured in the coupling, and the inclined end faces on both of the bolt pads such that they are at an oblique angle to the diametral plane of the coupling, such inclined end faces having the ability to slide relative to a like end face on an essentially identical coupling segment as the coupling segments are placed opposite each other on a pipe and tightened, the advantage being that a rotational twist of the coupling is not obtained and the draw of the coupling in along the linear long axis of the pipe. Preferably, when the coupling segments of the coupling are placed in position on the pipe, the inclined end faces of the bolting pads are positioned in a close relationship to each other in order to prevent a gap from forming and to prevent the sealing means from extruding from its position around the pipe. The angular relationship of the end faces of the bolting pads prevents a gap which more readily resists extrusion of the gasket.

BRIEF DESCRIPTION OF THE DRAWINGS

The invention will now be described with reference to the accompanying drawings, which are illustrative of the embodiments of the invention falling within the scope of the appended claims, and in which:

FIG. 1 is a side view of a segment of this invention showing the first and second bolt pads, said segment having only one bolt pad with an inclined face.

FIG. 2 is a plan view of the segment of FIG. 1 and shows the inside face and the hemihedral engagement means and a horizontal fastening means.

FIG. 4 is a side elevation of a pipe coupling with axial flanges showing the manner in which it fits on grooved pipe.

FIG. 5 is a side elevation of the pipe coupling showing one preferred embodiment of this invention.

FIG. 6 is a side view of one of the sealing means of this invention.

FIG. 7 is a side view of another preferred embodiment of this invention which is a bifaced coupling segment having two bolt lugs which are identical and have beveled faces.

FIG. 8A is an end view of the top bifaced coupling shown in FIG. 7

FIG. 8B is an end view of the bottom bifaced coupling segment in a partially exploded view showing the arrangement of the inclined faces of the bolt pads and the positioning of a double channeled sealing means; the coupling segment is shown below the top coupling segment of FIG. 8A and the dotted lines show how the two segments come together to form a completed coupling.

DESCRIPTION OF THE PREFERRED EMBODIMENTS

Figure 3:
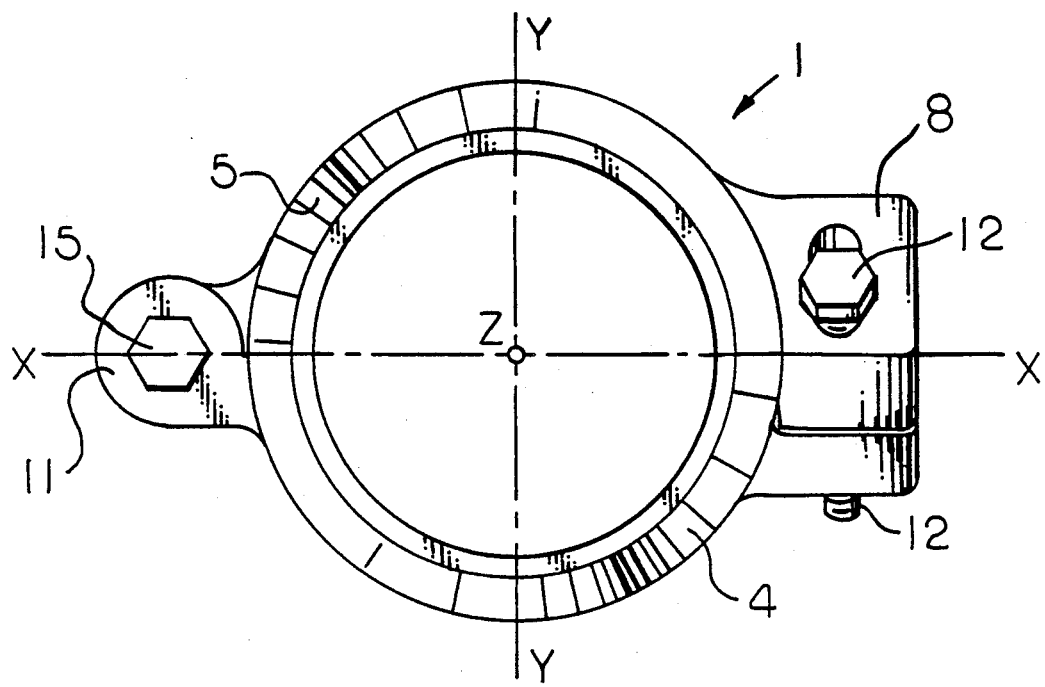
FIG. 3 is a front elevation of a pipe coupling formed by two segments of the invention showing the interrelation-ship of the coupling segments.
Figure 9:
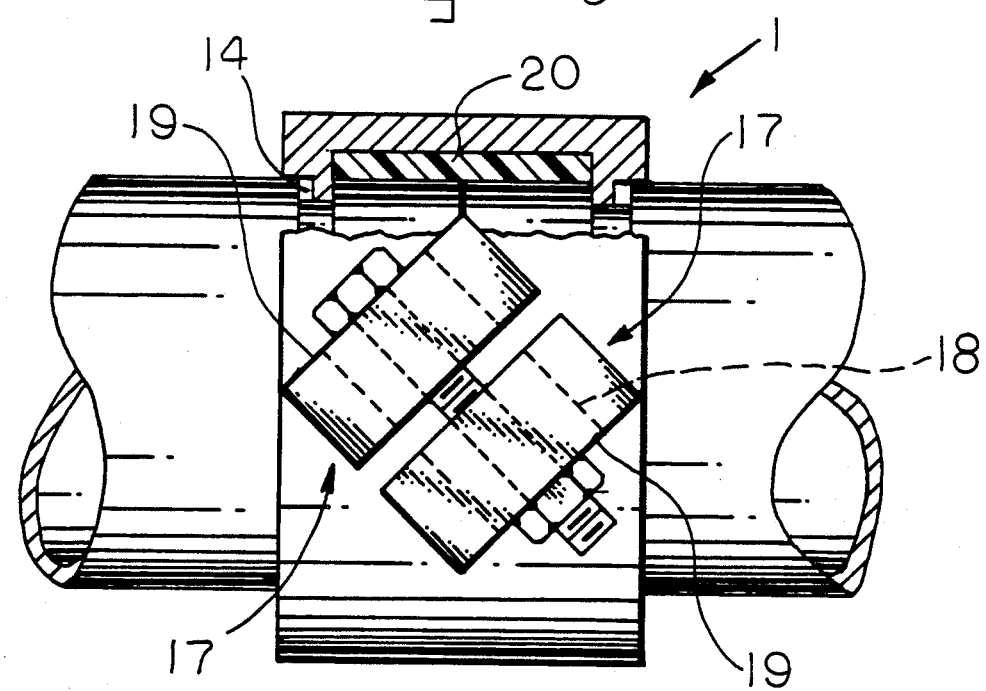
FIG. 9 is a view of the bifaced coupling segment of this invention showing it fully coupled on a pipe segment.

Referring now to FIG. 1 where there is shown a side view of a segment of this invention and FIG. 2, where there is shown a plan view of a segment of this invention showing the inside faces and the hemihedral engagement means, wherein like numbers have like designations, there is shown an arcuate body 1 composed of radial and walls 3 and axial wall 2, respectively, which provide a recess on the inside of the segment for the insertion of a sealing means (one such means shown in FIG. 6) which is provided at the time that two of such segments are 12 coupled to a pipe. For the convenience of clarifying the arrangement of the engagement means, described below, the segment has a following edge 4 and a leading edge 5, which differ in their configuration by the use of a inwardly extending engagement means 6 integrally mounted on only the following edge 4 to give a "hemihedral" surface, the use of the word "hemihedral" herein being applied to the inwardly extending engagement means integrally mounted on the axial wall 3 and the fact that only one such engagement means is used in the segment and that its position is such that it is on the following edge of the segment only, and that there is no such engagement means on the leading edge of the segment. The engagement means 6 is designed to engage a circumferential groove 14 in the end of pipe (see FIG.4) so as to clamp the pipe tightly and allow for the pipe to remain rigid and non-flexing.

The radial walls 3 are manufactured within certain tolerances to accommodate the surface of a coupled pipe (FIGS. 4 and 5) and lie in interfacial contact therewith and it should therefore be apparent to those skilled in the art that it is desirable that the engagement means 6 should not extend inwardly to the extent that it would not allow the radial walls 3 to lie in interfacial contact with the pipe, yet the engagement means 6 must extend inwardly to the degree that the engagement means 6 is seated in the pipe groove to the extent that it can engage the walls of the grooves and apply a clamping pressure to them to maintain the pipe in a rigid configuration.

In the following description, and in the appended claims, the orientations of the end faces of the couplings and the directions in which they are inclined are defined by reference to the respective axes and planes of the coupling, which can be found in FIG. 3.

It should be noted from FIG. 2 that the arcuate body 1 has first end faces 7 which are planar and lie essentially on a plane X-Z of the pipe coupling of this invention (to be described infra with reference to FIG. 3). with essentially no tilt of the face out of the X-Z plane. Such first end faces 7 lie parallel to the Z axis of the pipe. These first end faces are designed to allow two of the segments of this invention to be used together to form a coupling when the segments are placed in end-to-end engagement encircling juxtaposed pipe ends. Thus, pairs of first end faces 7 come essentially together to engage one another, but it is not necessary that the pairs meet exactly in each such coupling. What is important, is that there is enough gap between the pairs of first end faces 7 to allow the seating of the engagement means 6 in the grooves at the end of the pipes and further, that the radial walls 3 also are allowed to engage the outer walls of the pipe in a clamping arrangement. Therefore, within manufacturing tolerances, the pairs of first end faces 7 should engage exactly when the segments are tightly clamped around the pipe, or the first end faces 7 should have a slight gap between them to allow the engagement means 6 and the axial walls 3 to engage their respective portions of the pipe.

Continuing to referring to FIG. 2, the arcuate body 1 terminates in bolt pads 8 and 11 at each end, the bolt pads being an integral part of the acurate body 1, wherein together they form the segment, the first bolt pad 8 located on the outside surface of the arcuate body 1 and located nearer to the leading edge 5 of the arcuate body 1, has an elongated opening 9 therethrough and an inclined face 10 aligned for sliding engagement with a like inclined face 10 of a like bolt pad 8 having an elongated opening 9 therethrough. The elongated opening 9, elongated along the Z axis of the pipe coupling, permits lateral movement of the respective coupling segments 1 and such movement reduces the effective internal circumferential length of the inner periphery of the coupling, and, the clamping of the pipes thereby. The inclined faces 10 that are aligned for a sliding engagement with each other are co-planar with each other, and extend at an oblique angle in the range of approximately fifteen degrees to less than ninety degrees to the diametral X-Z plane of the coupling and perpendicular to the Y-Z plane. As indicated above, the opening g is elongated along the Z axis of the pipe and is intended to accommodate a fastening means 12 shown on FIG. 3, such as a bolt or the like to allow the fastening means 12 to move slightly in the Z axis direction, to accommodate the sliding of the like inclined faces 10 of the bolt pad 8. As further indicated above, the inclined face 10 of the bolt pad 8 lie planar in the diametral X-Z plane of the pipe coupling and extend perpendicular to the Y-Z plane of the pipe coupling. This configuration allows for the sliding of the two segments away from each other in the Z axial direction of the pipe coupling as the segments are tightened together to form the pipe coupling. This sliding action is accompanied by the circumferential tightening of the segments around the pipe, the clamping of the inwardly extending engagement means 6 in the grooves of the pipe and the clamping of the axial walls 3 against the pipe in essentially a simultaneous point in time as the fastening means 12 are tightened to give an optimum clamping of the juxtaposed pipe ends.

Also referring to FIG. 2, at the opposite end of the arcuate body 1 is a second bolt pad 11, having an opening 13 therethrough, which bolt pad is positioned such that the linear axis of the hole therethrough is parallel with the Z axis of the pipe.

Again, referring to FIG. 3, the tightening of the fastening means 12 in the bolt pads 8 will cause two actions to ensure that the pipe ends are securely clamped and that essentially no movement will take place. In the tightening down of the bolt pads 8 there will be a clamping engagement with the pipes such that the inwardly extending engagement means 6 will contact and seat themselves in the respective grooves of the pipes, while the respective pairs of faces 10 of the bolt pads 8 are moved into parallelism with each other for them to imprison the sealing means and prevent extrusion thereof. Due to the movement of the ends of the coupling segment, the end faces 10 of the bolt pads 8 progressively move into parallelism and face contact with the end faces ultimately resulting in the closure or the near complete closure of the gap between the respective pairs of end faces. The respective sliding actions and the flexure of the coupling segments accompanied by the closure of the gap between the bolting faces will in turn produce movement of the bolting pads 8 towards parallelism with each other and produce essentially full seating of the faces 10 of the bolt pads and the faces 7 of the arcuate body 1.

When the bolt pads 11 are drawn together by fastening means 15. (see FIG. 5) the inwardly extending engagement means 6 clamp the pipe groove edge and positively moves the pipe ends toward each other along the Z axis of the pipe coupling. Owing to the lack of oppositely placed inwardly extending engagement means 6, the inner face of the arcute body 1, that does not have an inwardly extending engagement means 6, has essentially no resistance and contacts the pipe surface directly, and thus provides an additional means of securely holding the pipe.

One preferred embodiment of this invention is the use of axially outwardly extending flanges which are an integral part of the walls of the coupling as is shown in FIG. 5 wherein the such flanges are shown as 16. The outwardly extending flanges cause the pipe ends to be better stabilized resulting in zero flex of the pipe ends.

Turning now to a description of the bifaced coupling segment, and with reference to FIG. 7, there is shown a side view of the bifaced segment of this invention showing bolt pads 17.

This coupling segment is similar to the hemihedral segment with two differences. Engagement means 6 shown in phantom, are formed on both the leading and following edges and the bolt pads 17. Further, the bifaced segment has first end faces 7 which are planar and lie essentially on a plane X-Z of the pipe coupling of this invention, with essentially no tilt of the faces out of the X-Z plane. Such first end faces 7 lie parallel to the Z axis of the pipe, and perform essentially as do the end faces of the hemihedral segment. Thus, pairs of first end faces 7 come essentially together to engage one another, but it is not necessary that the pairs meet exactly in each such coupling.

As with the hemihedral segment, the arcuate body 1 terminates in bolt pads 17 at each end, the bolt pads being an integral part of the acurate body 1, wherein together they form the segment. The bolt pads are located on the outside surface of the arcuate body 1 and located nearer to the leading edge of the arcuate body 1.

They have an elongated opening 18 therethrough and an inclined face 19 aligned for sliding engagement with a like inclined face 19 of a like bolt pad 17 having an elongated opening 18 therethrough. The elongated opening 18, elongated along the Z axis of the pipe coupling, permits lateral movement of the respective coupling segments 1 and such movement reduces the effective internal circumferential length of the inner periphery of the coupling, and, the clamping of the pipes thereby. The inclined faces 19 that are aligned for a sliding engagement with each other are co-planar with each other, and extend at an oblique angle in the range of approximately fifteen degrees to less than ninety degrees to the diametral X-Z plane of the coupling and perpendicular to the Y-Z plane. As indicated above, the opening 18 is elongated along the Z axis of the pipe and is intended to accommodate a fastening means (not shown) such as a bolt or the like to allow the fastening means to move slightly in the Z axis direction, to accommodate the sliding of the like inclined faces 19 of the bolt pad 17. As further indicated above, the inclined faces 19 of the bolt pads 1 lie planar in the diametyral X-Z plane of the pipe coupling and extend perpendicular to the Y-Z plane of the pipe coupling. This configuration allows for the sliding of the two segments away from each other in the Z axial direction of the pipe coupling as the segments are tightened together to form the pipe coupling. However, it should be remembered, that the end faces 7 tend to prevent this sliding action from being too egregious and that rotational twist is prevented thereby.

Turning to FIGS. 8A and 8B, this figure is provided to show the relative relationship of the bifaced coupling segments. Such figure also shows the dual channeled sealing means 20 in position in one of the coupling segments.

Finally, there is shown in FIG. 6 a sealing means of this invention which is a single flat elastomeric member of rectangular configuration having on its upper surface and near one end, an elastomeric dimple 17 configured to fit into a pocket 18 in the elastomeric member, which pocket is located in the under surface and near the end of the elastomeric member opposite the end having the elastomeric dimple. This sealing means is designed to be used in the hemihedral coupling segment.

Thus, what has been described in its simplest form is a coupling segment, which when used in conjunction with a like coupling segment, provides a coupling for use in securing the juxtaposed ends of pipe, such pipe having grooves encircling their ends. There is also provided a coupling for the holding of pipe ends and a method of securing pipe to form a pipeline.

I claim:

1. In pipe coupling of the type including two arcuate coupling segments and a fastening means, each, said coupling segment being configure essentially identical to the other, each said coupling segment comprising:
 an arcuate body comprised of radial and axial walls providing for the reception of sealing means, said radial walls defining a leading edge and a following edge of the arcuate body;
 each said arcuate body having radially inwardly extending engagement means near the following edge for clamping engagement with an end of one of two pipe members arranged in juxtaposed relationship for coupling;
 each said arcuate body having first end faces on each end of the arcuate body which can be positioned in facial engagement with like end faces of one other like coupling segment, said first end faces being essentially planar in the diametral X-Z plane of a pipe coupling and extending parallel to the longitudinal Z axis of the pipe coupling;
 each said arcuate body terminating in bolt pads at both ends, said bolt pads being used as a means for securing one coupling segment to another like coupling segment in end-to-end encircling relationship about two pipe members;
 first said bolt pad being located near to the leading edge of the arcuate body thereof and having an opening therethrough, said first bolt pad having an inclined end face aligned for sliding face engagement with a like inclined end face of a first bolt pad of another such coupling segment, said end face being inclined at an oblique angle to the diametral X-Z plane of the pipe coupling and extending perpendicular to the Y-Z plane of the pipe coupling;
 a second bolt pad on the opposite end of the arcuate body and near to the following edge thereof, being a lug having a opening therethrough for receiving a fastening means, said lug being aligned such that an axis through the center of the opening is aligned parallel to the longitudinal Z axis of the pipe members;
 said fastening means relative to the first bolt pad being operative to urge said end faces of the first bolt pad of each coupling segment towards each other to slide said first end faces across each other and to reduce the effective internal circumferential length of the inner periphery of said coupling; and
 said fastening means relative to the second bolt pad being operative to draw the inwardly extending engagement means of one arcuate coupling segment against the end of one pipe member and to draw the inwardly extending engagement means of the other arcuate coupling segment against the end of the other pipe member and along the longitudinal Z axis of the pipe members, permitting said engagement means to clamp onto and secure the pipe member, sealing means being retained in the pipe coupling by the radial nd axial walls and radially extending engagement means of the arcuate coupling segments and the exterior walls of the pipe members.

2. The coupling as claimed in claim 1 in which the fastening means are bolts with nuts.

3. An arcuate coupling segment, said coupling segment comprising:
 an arcuate body comprised of radial and axial walls providing for the reception of a sealing means, said radial walls defining a leading edge and a following edge of the arcuate body;
 said arcuate body having radially inwardly extending engagement means near the following edge for clamping engagement with an end of one of two pipe members arranged in juxtaposed relationship for coupling;
 said arcuate body having first end faces on each end of the arcuate body which can be positioned in facial engagement with like end faces of one other like coupling segment, said first end faces being essentially planar in the diametral X-Z plane of a pipe coupling and extending parallel to the longitudinal Z axis of the pipe coupling;
 said arcuate body terminating in bolt pads at both ends, said bolt pads being used as means for securing one coupling segment to another like coupling segment in end-to-end encircling relationship about a pipe;

first said bolt pad being located near to the leading edge of the arcuate body thereof and having an opening therethrough, said first bolt pad having an inclined end face aligned for sliding face engagement with a like inclined end face of a first bolt pad of another coupling segment, said end face being inclined at an oblique angle to the diametral X-Z plane of a pipe coupling and extending perpendicular to the Y-Z plane of a pipe coupling;

a second bolt pad on the opposite end of the arcuate body and near to the following edge thereof, being a lug having a opening therethrough for receiving a fastening means, said lug being aligned such that an axis through the center of the opening is aligned parallel to the longitudinal Z axis of the pipe members.

4. The coupling segment as claimed in claim 3 in which said first end faces are planar.

5. The coupling segment as claimed in claim 3 in which there is also present axially outwardly extending flange means on the arcuate body.

6. A method of securing two pipes using two of the arcuate coupling segments of claim 3, the method comprising securing two arcuate coupling segments containing a sealing means in end-to-end encircling relationship about pipe ends which are juxtaposed to each other.

7. An arcuate coupling segment, said coupling segment comprising:

an arcuate body comprised of radial and axial walls providing for the reception of a sealing means, said axial walls defining a leading edge and a following edge of the arcuate body;

each said arcuate body having radially inwardly extending engagement means near the following edge and the leading edge for clamping engagement with ends of two pipe members arranged in juxtaposed relationship for coupling;

each said arcuate body having first end faces on each end of the arcuate body which can be positioned in facial engagement with like end faces of one other like coupling segment, said first end faces being essentially planar in the diametral X-Z plane of a pipe coupling and extending parallel to the longitudinal Z axis of the pipe coupling;

each said arcuate body terminating in bolt pads at both ends, said bolt pads being used as a means for securing one coupling segment to another like coupling segment in end-to-end encircling relationship about two pipe members;

said bolt pads being located near to the leading edge of the arcuate body thereof and having an opening therethrough to receive a fastening means, each said bolt pad having an inclined end face aligned for sliding face engagement with a like end face of one other such coupling segment, each said inclined end face being inclined at an oblique angle to the diametral X-Z plane of the pipe coupling and extending perpendicular to the Y-Z plane of the pipe coupling;

said fastening means relative to the bolt pads being operative to urge said first end faces of each bolt pad of each coupling segment towards each other and then to slide said first end faces across each other to reduce the effective internal circumferential length of the inwardly extending engagement means against the pipe members and along the longitudinal axis of the pipe members, permitting said engagement means to clamp onto and secure the pipe member, sealing means being retained in the pipe coupling by the radial and axial walls and radially extending engagement means of the arcuate coupling segments and the exterior walls of the pipe members.

8. The coupling segment as claimed in claim 7 in which there is also present axially outwardly extending flange means on the arcuate body extending along the longitudinal Z axis from the radial walls.

9. A method of securing two pipes using two of the arcuate coupling segments of claims 7, the method comprising securing two arcuate coupling segments containing a sealing means in end-to-end encircling relationship about pipe ends which are juxtaposed to each other.

10. The coupling segment as claimed in claim 7 in which each inclined end face is inclined at an oblique angle in a range of from fifteen degrees to less than ninety degrees.

11. In a pipe coupling of the type including two arcuate coupling segments nd a fastening means, each said coupling segment being configured essentially identical to the other, each said coupling segment comprising;

an arcuate body comprised of radial and axial walls providing for the reception of sealing means, said radial walls defining a leading edge and a following edge of the arcuate body;

each said arcuate body having radially inwardly extending engagement means near the following edge for clamping engagement with ends of two pipe members arrange in juxtaposed relationship for coupling;

each said arcuate body having first end faces on each end of the arcuate body which can be positioned in facial engagement with like end faces of one other like coupling segment, said first end faces being essentially planar in the diametral X-Z plane of a pipe coupling and extending parallel to the longitudinal Z axis of the pipe coupling;

each said arcuate body terminating in bolt pads at both ends, said bolt pads being used as a means for securing one coupling segment to another like coupling segment in end-to-end encircling relationship about two pipe members;

said bolt pads being located near to the leading edge of the arcuate body thereof and having an opening therethrough to receive a fastening means, each said bolt pad having an inclined end face aligned for facing engagement with a like inclined end face of a bolt pad of another such coupling segment, each said inclined end face being inclined at an oblique angle to the diametral X-Z plane of the pipe coupling and extending perpendicular to the Y-Z plane of the pipe coupling;

said fastening means relative to the bolt pads being operative to urge said first end faces of each bolt pad of each coupling segment towards each other and then to slide said first end faces across each other to reduce the effective internal circumferential length of the inner periphery of said pipe coupling in order to draw the inwardly extending engagement means against the pipe members and along the longitudinal Z axis of the pipe members permitting said engagement means to clamp onto and secure the pipe member, the sealing means being retained in the pipe coupling by the radial and axial walls and radially extending engagement means of the arcuate coupling segments and the exterior walls of the pipe members.

12. The coupling segment as claimed in claim 11 in which there is also present axially outwardly extending flange means on the arcuate body extending from the radial wall along the longitudinal Z axis.

13. The coupling segment as claimed in claim 11 in which each inclined end face is inclined at an oblique angle in a range of from fifteen degrees to less than ninety degrees.

14. An arcuate coupling segment, said coupling segment comprising:

an arcuate body comprised of radial and axial walls providing for the reception of a sealing means, said radial walls defining a leading edge and a following edge of the arcuate body;

each said arcuate body having radially inwardly extending engagement means near the following edge for clamping engagement with ends of two pipe members arranged in juxtaposed relationship for coupling;

each said arcuate body having first end faces on each end of the arcuate body which can be positioned in facial engagement with like end faces of one other like coupling segment, said first end faces being essentially planar in the diametral X-Z plane of a pipe coupling and extending parallel to the longitudinal Z axis of the pipe coupling;

each said arcuate body terminating in bolt pads at both ends, said bolt pads being used as a means for securing one coupling segment to another like coupling segment in end-to-end encircling relationship about two pipe members;

said bolt pads being located near to the leading edge of the arcuate body thereof and having an opening therethrough to receive a fastening means, each said bolt pad having an inclined end face aligned for sliding face engagement with a like end face of one other such coupling segment, each said inclined end face being inclined at an oblique angle to the diametral X-Z plane of the pipe coupling and extending perpendicular to the Y-Z plane of the pipe coupling;

said fastening means relative to the bolt pads being operative to urge said first end faces of each bolt pad of each coupling segment towards each other and then to slide said first end faces across each other to reduce the effective internal circumferential length of the inner periphery of said pipe coupling in order to draw the inwardly extending engagement means against the pipe members and along the longitudinal Z axis of the pipe members, permitting said engagement means to clamp onto and secure the pipe member, the sealing means being retained in the pipe coupling by the radial and axial walls and radially extending engagement means of the arcuate coupling segments and the exterior walls of the pipe members.

15. The coupling segment as claimed in claim 14 in which there is also present axially outwardly extending flange means on the arcuate body extending from the radial wall along the longitudinal Z axis.

16. A method of securing two pipes using two of the arcuate coupling segments of claims 14, the method comprising securing two arcuate coupling segments containing a sealing means in end-to-end encircling relationship about two pipe ends which are juxtaposed to each other.

17. The coupling segment as claimed in claim 14 in which each inclined end face is inclined at an oblique angle in a range of from fifteen degrees to less than ninety degrees.

* * * * *